US008225657B2

(12) United States Patent
Shao et al.

(10) Patent No.: US 8,225,657 B2
(45) Date of Patent: Jul. 24, 2012

(54) METHOD AND APPARATUS FOR QUANTITATIVELY DETECTING UNBALANCED STATE AND METHOD FOR DETECTING CLAMPING STATE OF A WORKPIECE

(75) Inventors: Xiao Yin Shao, Beijing (CN); Wei Min Ma, Beijing (CN); Qing Gang Wang, Beijing (CN); Wen Gang Shi, Beijing (CN); Xi Hu, Beijing (CN); Jian Hui Xing, Beijing (CN); Yue Zhuo, Beijing (CN)

(73) Assignee: Siemens Aktiengesellschaft, München (DE)

( * ) Notice: Subject to any disclaimer, the term of this patent is extended or adjusted under 35 U.S.C. 154(b) by 463 days.

(21) Appl. No.: 12/497,963

(22) Filed: Jul. 6, 2009

(65) Prior Publication Data
US 2010/0000320 A1 Jan. 7, 2010

(30) Foreign Application Priority Data
Jul. 7, 2008 (CN) .......................... 2008 1 0135639

(51) Int. Cl.
G01M 1/16 (2006.01)
(52) U.S. Cl. .............................. 73/460; 73/66
(58) Field of Classification Search .................. 73/487, 73/460, 462, 468, 66
See application file for complete search history.

(56) References Cited

U.S. PATENT DOCUMENTS

| | | | |
|---|---|---|---|
| 4,214,179 A | 7/1980 | Gutierrez | |
| 5,543,698 A | 8/1996 | Merrison | |
| 5,800,331 A | 9/1998 | Song | |
| 6,591,200 B1 * | 7/2003 | Cohen et al. | 702/38 |
| 7,630,869 B2 * | 12/2009 | Shen et al. | 703/6 |
| 7,643,933 B2 * | 1/2010 | Hirata | 701/124 |
| 7,902,719 B2 * | 3/2011 | Hull | 310/317 |
| 7,905,122 B2 * | 3/2011 | Murray et al. | 68/12.06 |
| 2004/0243332 A1 * | 12/2004 | Shen et al. | 702/85 |
| 2007/0044555 A1 * | 3/2007 | Busch et al. | 73/471 |
| 2007/0294049 A1 * | 12/2007 | Pierce et al. | 702/151 |
| 2008/0041116 A1 * | 2/2008 | Kanazawa et al. | 68/23.2 |

FOREIGN PATENT DOCUMENTS
WO WO 2004097099 A1 11/2004

OTHER PUBLICATIONS

A Control System Based on the Lagrange Modeling Method for a Single Link Rotary Inverted Pendulum; Wu Aiguo et al; School of Electrical Engineering & Automation, Tianjin University 2005; Magazine; 2005; CN.

(Continued)

Primary Examiner — Helen C. Kwok
(74) Attorney, Agent, or Firm — Henry M. Feiereisen; Ursula B. Day (57) ABSTRACT

A method and an apparatus for quantitatively detecting the unbalanced state of a rotating shaft and a clamping state of a workpiece clamped to a shaft are disclosed by solving with a nonlinear multivariable method a Lagrange kinematics equation to determine from acquired position, velocity, acceleration and torque signals of the rotating shaft an unbalanced amplitude variable and an unbalanced angle variable of the rotating shaft, optionally both with and without a workpiece. The motor driving the shaft is energized with a combined S-shaped and sinusoidal velocity profile with a position profile component, a velocity profile component, and an acceleration profile component. The components are selected such that the motor speed during the accelerating and decelerating stages does not change abruptly.

17 Claims, 8 Drawing Sheets

OTHER PUBLICATIONS

Four-run balance tutorial: Balance software for the ST-101 and other vibration meters without phase measurement capability: in: http://www.spintelligentlabs.com/SL-docs/4runtutorial.pdf; Others.

Spintelligent Labs Revolutionary Science Retrieved from the Internet on: Sep. 21, 2007.

* cited by examiner

□ Tested values of the unbalanced amplitude an unbalanced angle without additional load, which were obtained by using the quantitative detecting method for unbalanced status of the rotating shaft △ Theoretical values of the unbalanced amplitude and unbalanced angle with a net additional load + Actual values of the unbalanced amplitude and unbalanced angle with the additional load ◊ Tested values of the unbalanced amplitude and unbalanced angle with the additional load, which were obtained by using the quantitative detecting method for unbalanced status of the rotating shaft

METHOD AND APPARATUS FOR QUANTITATIVELY DETECTING UNBALANCED STATE AND METHOD FOR DETECTING CLAMPING STATE OF A WORKPIECE

CROSS-REFERENCES TO RELATED APPLICATIONS

This application claims the priority of Chinese Patent Application, Serial No. 200810135639.5, filed Jul. 7, 2008, pursuant to 35 U.S.C. 119(a)-(d), the content of which is incorporated herein by reference in its entirety as if fully set forth herein.

BACKGROUND OF THE INVENTION

The present invention relates to a method and apparatus for detecting the unbalanced state of a rotating shaft and a method for detecting the clamping state of a workpiece and, particularly, to a method and apparatus for quantitatively detecting the unbalanced state of a rotating shaft driven by a motor and a method for detecting the clamping state of a workpiece.

The following discussion of related art is provided to assist the reader in understanding the advantages of the invention, and is not to be construed as an admission that this related art is prior art to this invention.

With the technological developments, modern manufacturing and machining processes have increasingly higher and higher requirements with regard to manufacturing accuracy and precision.

However, a rotating shaft driven by a motor of manufacturing equipment (such as a machine tool) can appear in an unbalanced state for a variety of reasons, and this affects not only the service life of various mechanical components, but also the machining accuracy and precision:

the centrifugal force produced by the unbalanced state of the rotating shaft affects a smooth rotation;

the unbalanced state of the rotating shaft is a main reason resulting in the generation of vibration;

the vibration due to the unbalanced state of the rotating shaft will cause the workpiece to jitter, which affects the machining;

the unbalanced state of the rotating shaft results in the excessive wear of the bearings, and the overfatigue of the bearing structure; and the unbalanced state of the rotating shaft results in power loss.

It can be seen that, whether a rotating shaft is in a balanced state or not is an important issue in machining and, therefore, it is necessary to provide a method for detecting the unbalanced state of the rotating shaft.

The unbalanced state of a rotating element can be detected, for example, by using an additional sensor, wherein the sensor detects the distance change between a rotor's actual position and a reference position, and sends out a corresponding signal when the occurrence of an unbalanced state is determined. Alternatively, a vibration or physical pressure of a system can be measured with an electric sensor, wherein an accelerometer is used to measure the vibration in the system, with a signal processing system determining a spectral power density of the measured value, thereby determining the frequency spectrum and a total energy spectrum of the measured vibration, and determining the unbalanced state of the rotor by the energy spectrum of the vibration. In another approach, a test weight can be externally applied to the rotating body and the introduced vibrations measured with a vibrating sensor.

The above-mentioned methods require expensive additional sensors or trial weights which are difficult to install in the equipment, especially in the rotary drive system of precision equipment; in addition, these measurement need to be performed by trained personnel.

In another approach that does not require an additional sensor or weight, the unbalanced state of a load is derived from signals of a motor driver, wherein a phase angle spectrum is determined from the phase angle between a stator winding voltage and a stator winding current, wherein the difference between a maximum phase angle and a minimum phase angle during a mechanical period is used as an indication when the load is in an unbalanced state. However, this approach is rather qualitative and thus cannot provide the relevant data for subsequent manual or automatic correction.

The above-mentioned various cases of poor clamping state of the workpiece will all lead to an error during machining and seriously affect the machining accuracy and precision, and therefore, it is necessary to provide a method for detecting the clamping state of a workpiece.

The currently available methods for detecting the clamping state of a workpiece generally use a micrometer gauge to perform the manual measurement, and the efficiency of such methods is low and reading errors are prone to occur.

It would therefore be desirable and advantageous to address prior art problems and to obviate other prior art shortcomings by quantitatively detecting and measuring the unbalanced state of a rotating shaft and assessing the clamping state of a workpiece.

SUMMARY OF THE INVENTION

In view of the situation, the present invention provides a method for quantitatively detecting the unbalanced state of a rotating shaft, so as to accurately judge the unbalanced state of the rotating shaft by detecting a value of unbalanced amplitude and a value of unbalanced angle of the rotating shaft.

The present invention also provides an apparatus for quantitatively detecting the unbalanced state of a rotating shaft, so as to accurately judge the unbalanced state of the rotating shaft by detecting a value of unbalanced amplitude and a value of unbalanced angle of the rotating shaft.

Moreover, the present invention also provides an accurate and effective method for detecting the clamping state of a workpiece.

According to one aspect of the present invention, a method for quantitatively detecting an unbalanced state of a rotating shaft includes the steps of driving the rotating shaft, acquiring a position signal, a velocity signal, an acceleration signal, and a torque signal of the rotating shaft, and establishing, according to the rotational kinetic energy and the potential energy of the rotating shaft, a Lagrange kinematics equation including an unbalanced amplitude variable and an unbalanced angle variable of the rotating shaft. The method further includes acquiring, according to the position signal, velocity signal, acceleration signal, and torque signal, a value of the unbalanced amplitude and a value of the unbalanced angle of the rotating shaft by solving the equation by means of a nonlinear multivariable method. The unbalanced amplitude of the rotating shaft is defined as the product of the length of the vertical line segment from the centroid of the rotating shaft to the axis of the rotating shaft and the mass of the rotating shaft, and the unbalanced angle is defined as the included angle between the vertical line segment from the centroid of the rotating shaft to the axis of the rotating shaft and the horizontal axial plane of the rotating shaft.

According to another aspect of the invention, an apparatus for quantitatively detecting an unbalanced state of a rotating shaft includes a drive unit driving the rotating shaft, a signal acquisition unit for acquiring a position signal, a velocity signal, an acceleration signal, and a torque signal, and an unbalanced amplitude value and unbalanced angle calculating unit, which establishes a Lagrange kinematics equation including an unbalanced amplitude variable and an unbalanced angle variable of the rotating shaft according to a rotational kinetic energy and a potential energy of the rotating shaft, and acquires a value of unbalanced amplitude and a value of unbalanced angle of the rotating shaft by solving the equation with a nonlinear multivariable method according to the acquired position signal, the acquired velocity signal, the acquired acceleration signal, and the acquired torque signal. The unbalanced amplitude of the rotating shaft is defined as the product of the length of the vertical line segment from the centroid of the rotating shaft to the axis of the rotating shaft and the mass of the rotating shaft, and the unbalanced angle is defined as the included angle between the vertical line segment from the centroid of the rotating shaft to the axis of the rotating shaft and the horizontal axial plane of the rotating shaft.

According to yet another aspect of the invention, a method for detecting a clamping state of a workpiece includes the steps of detecting an unbalanced amplitude and an unbalanced angle of the rotating shaft without the clamped workpiece with the aforedescribed method, and computing from the unbalanced amplitude and the unbalanced angle a first unbalanced offset vector:

$$\vec{M} = A_1 \angle \theta_1$$

wherein, $A_1$ is the unbalanced amplitude of the rotating shaft without the workpiece being clamped, and $\theta_1$ is the unbalanced angle of the rotating shaft without the workpiece being clamped, detecting an unbalanced amplitude and an unbalanced angle of the rotating shaft with the workpiece clamped on the rotating shaft with the aforedescribed method, and computing from the unbalanced amplitude and the unbalanced angle a second unbalanced offset vector:

$$\vec{N} = A_2 \angle \theta_2$$

wherein, $A_2$ is the unbalanced amplitude of the rotating shaft with the workpiece being clamped, and $\theta_2$ is unbalanced angle of the rotating shaft with the workpiece being clamped, calculating a difference vector between the unbalanced offset vector without the workpiece being clamped and the unbalanced offset vector with the workpiece being clamped:

$$\vec{R} = \vec{M} - \vec{N} = A_R \angle \theta_R$$

wherein, $A_R$ is the unbalanced amplitude of the difference vector, and $\theta_R$ is the unbalanced angle of the difference vector, and determining from the difference vector the clamping state of the workpiece, wherein a bigger $A_R$ of the difference vector $\vec{R}$ indicates a bigger unbalanced deviation of the workpiece, representing an inferior clamping state of the workpiece.

Embodiments of the invention may include one or more of the following features. The acquired position signal, velocity signal, acceleration signal and torque signal of the rotating shaft may be filtered.

According to another embodiment of the present invention, the rotating shaft may be driven with a motor. The motor may be energized with a combined S-shaped and sinusoidal velocity profile having a position profile component, a velocity profile component, and an acceleration profile component. The profiles may then be divided along a time axis into an accelerating stage, a sinusoidal velocity profile stage, and a decelerating stage, with the combined S-shaped and sinusoidal velocity profile being selected such that a velocity of the motor during the accelerating and decelerating stages does not exhibit an abrupt change.

According to one embodiment of the present invention, the nonlinear multivariable method may be a least square method.

The method and apparatus for quantitatively detecting the unbalanced state of a rotating shaft of the present invention can conveniently acquire the value of the unbalanced amplitude and the value of the unbalanced angle of the rotating shaft by applying the drive signals acquired from the motor itself, to accurately judge the unbalanced state of the rotating shaft. This solves obviates the need for additional sensors which are expensive, difficult to install and difficult to use, allows a qualitative measurement whether a load is in an unbalanced state by detecting the signals of the motor driver.

The method for detecting the clamping state of a workpiece of the present invention acquires unbalanced offset vectors before and after the workpiece is clamped by using the above method for quantitatively detecting the unbalanced state of the rotating shaft, and according to the magnitude of the offset vector, whether the workpiece is clamped properly can be found out effectively, thus avoiding errors associated with manually reading the measurement values.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 6 (a) to (e) are schematic diagrams of using the method for quantitatively detecting unbalanced state of the rotating shaft of the present invention to conduct tests, wherein (a) is a schematic diagram of conducting the tests without additional load on the rotating shaft, and (b) to (e) are schematic diagrams of conducting the tests with additional load on the different positions of the rotating shaft;

FIGS. 7 (a) to (e) are polar coordinate diagrams of test results corresponding to the tests of FIGS. 6 (a) to (e);

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
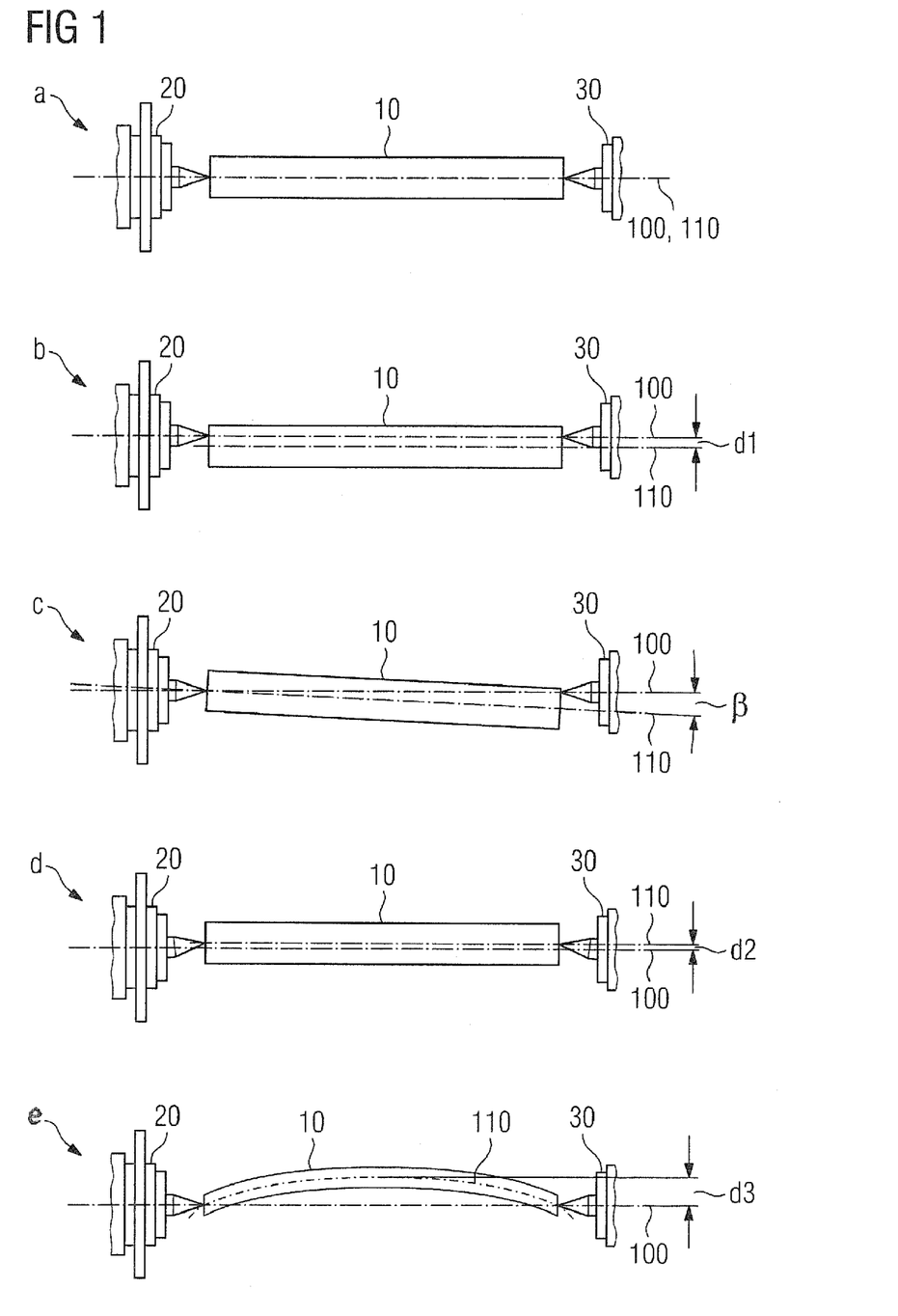
FIGS. 1(a) to 1(e) are schematic diagrams of the most common clamping situations of workpieces.

For a better understanding of the method and system of the invention, reference is now made to FIGS. 1(a) to 1(e) which illustrate in form of schematic diagrams the most common clamping situations of workpieces. For example, when a workpiece 10 is machined on a lathe, a mill or a grinder, the workpiece 10 is normally clamped between a work head 20 and a tailstock 30, as shown in FIG. 1(a), with the axis 110 of the workpiece 10 ideally coinciding with the axis 100 of the rotating shaft driven by the motor. Machining of the workpiece under those conditions will ensure maximum machining accuracy and precision.

However, in practice, the workpiece may be incorrectly clamped, which is difficult to judge with the naked eye. For example, as shown in FIG. 1(b), there may be an offset d1 between the axis 110 of the workpiece 10 and the axis 100 of the rotating shaft due to incorrect positioning of the workpiece 10. In another situation illustrated in FIG. 1(c), the axis 110 of workpiece 10 and the axis 100 of the rotating shaft may enclose an angle β; FIG. 1(d) illustrates a situation, where due to the inclination of the work head 20 and the tailstock 30 for clamping the workpiece 10, there is an offset d2 between the axis 110 of workpiece 10 and the axis 100 of the rotating shaft; and FIG. 1(e) illustrates a situation where the workpiece 10 is bent and/or deformed, with an offset of d3 between the apex of the bent axis 110 of the workpiece 10 and the axis 100 of the rotating shaft.

Figure 2:
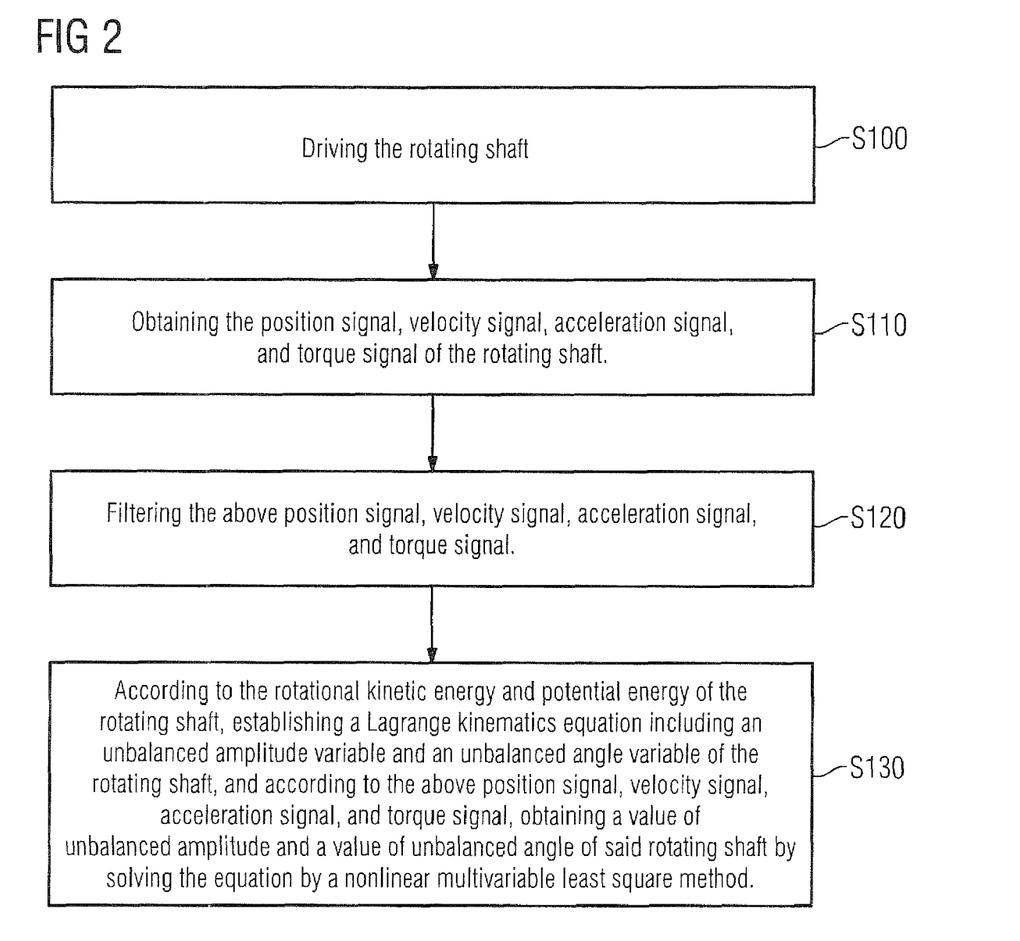
FIG. 2 is a flowchart of a method for quantitatively detecting the unbalanced state of a rotating shaft in the present invention.

FIG. 2 illustrates in form of a flow diagram a method for quantitatively detecting the unbalanced state of a rotating shaft according to the present invention, which includes the following steps:

At a first step S100 of the process, the rotating shaft driving with a drive signal.

No sensor is used to qualitatively detect whether the rotating shaft is in an unbalanced state; instead the quantitative detection of an unbalanced state of the rotating shaft is done by way of the drive signal. In order to acquire a high-quality drive signal, the energizing signal should be optimized when a motor is energized to drive the rotating shaft, and tests have shown that the unbalanced state of the rotating shaft is very sensitive to the signal noise during the initial stage and ending stage in running the motor and therefore, in order to reduce the signal noise during the initial stage and ending stage of running the motor, a S-shaped and sinusoidal combined velocity profile is used as an energizing signal of the motor in the method for quantitatively detecting the unbalanced state of the rotating shaft according to the present invention. Details of the drive signal will be described below with reference to FIG. 3.

At step S110, the position signal, velocity signal, acceleration signal, and torque signal of the rotating shaft are acquired.

These signals can be acquired easily from the motor itself, for example, the position signal can be acquired first, then the velocity signal and the acceleration signal can be obtained successively by calculating the derivatives, and the torque signal can be obtained by measuring the current of the motor and then doing the calculation.

At step S120, the position signal, velocity signal, acceleration signal, and torque signal may be filtered. The step is optional, and may be performed to further optimize the above signals.

At step S130, a Lagrange kinematics equation is established which takes into consideration the rotational kinetic energy and potential energy of the rotating shaft, which includes an unbalanced amplitude variable and an unbalanced angle variable of the rotating shaft, and according to the position signal, velocity signal, acceleration signal and torque signal, a value of unbalanced amplitude and a value of unbalanced angle of the rotating shaft are obtained by solving the equation with a nonlinear multivariable least square method.

The unbalanced amplitude and unbalanced angle in the present invention are defined as follows: wherein, the unbalanced amplitude of the rotating shaft is the product of the length of a vertical line segment from the centroid of the rotating shaft to the axis of the rotating shaft and the mass of the rotating shaft, and the unbalanced angle of the rotating shaft is the included angle between the vertical line segment from the centroid of the rotating shaft to the axis of the rotating shaft and a horizontal axial plane of the rotating shaft. Therefore, the degree of unbalance of the rotating shaft can be clearly reflected by the unbalanced amplitude and unbalanced angle.

Figure 3:
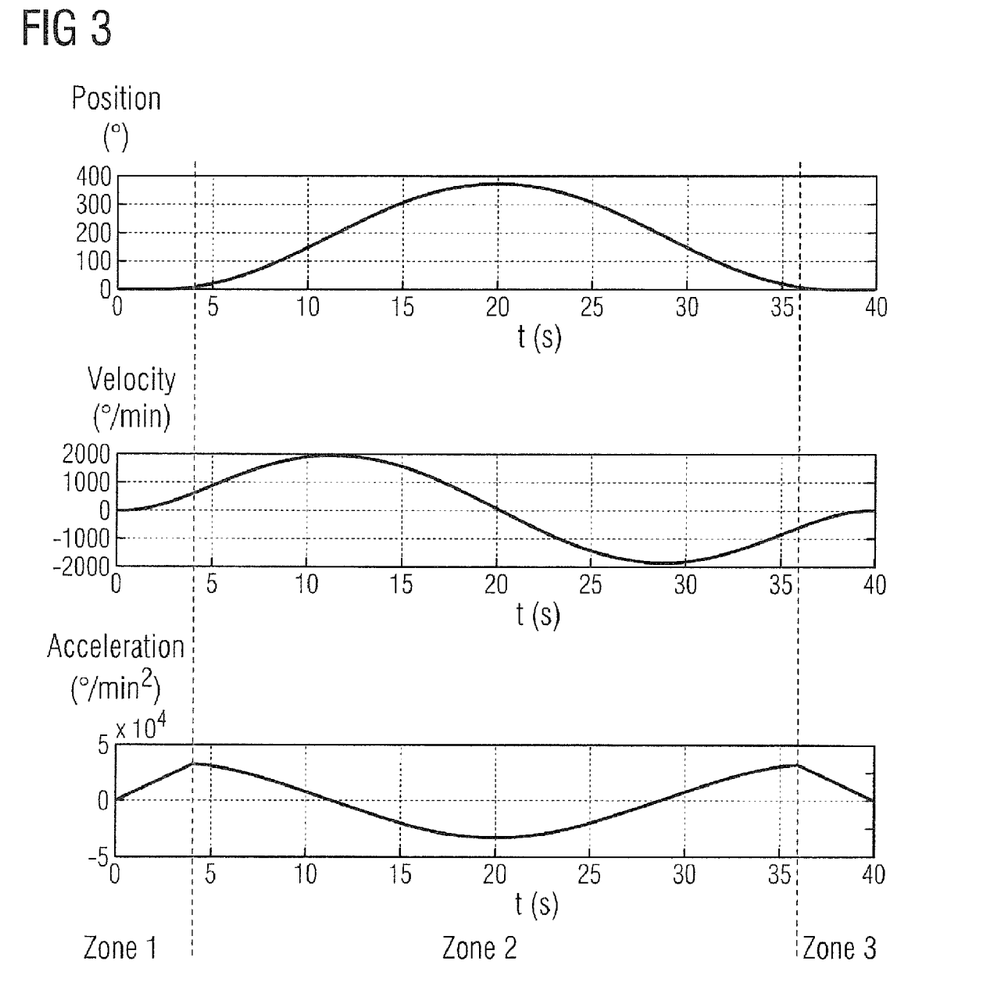
FIG. 3 is a combined velocity profile when the method for quantitatively detecting the unbalanced state of the rotating shaft of the present invention is used to energize a motor.

Referring to FIG. 3, the combined velocity profile includes a position (in degrees) profile, a velocity (in degrees/min) profile and an acceleration (in degrees/min$^2$) profile. These profiles can be divided in the direction of the time axis into three zones: zone 1 representing the accelerating stage; zone 2 representing the sinusoidal velocity profile stage; and zone 3 representing the decelerating stage, respectively. The velocity profile is selected such that the velocity of the motor in the above accelerating and decelerating stages will not experience a sudden change. By using the above combined velocity profile, the signal noise during the initial stage and ending stage of running the motor can be effectively reduced.

Figures 4, 5:
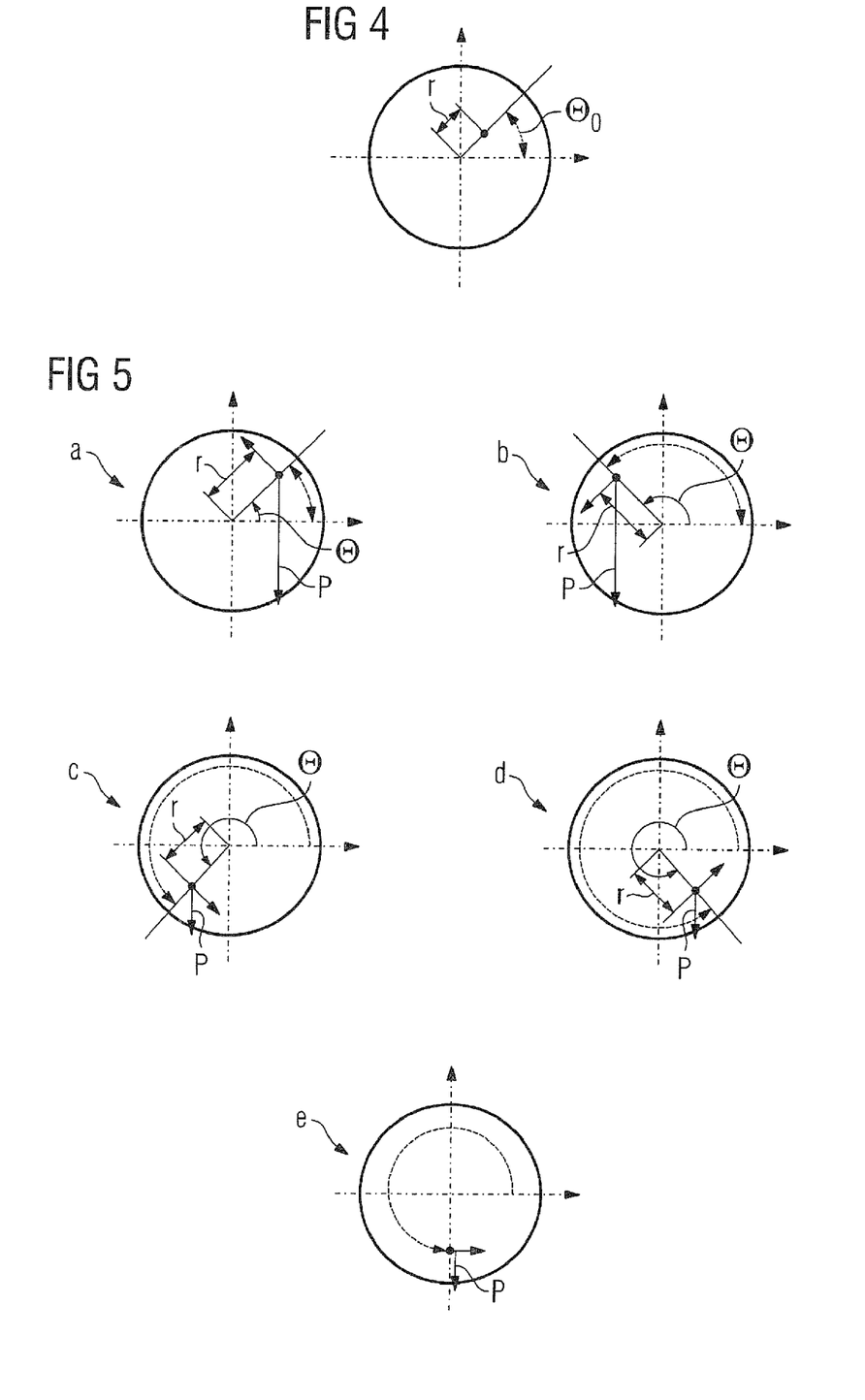
FIG. 4 is a schematic diagram of the unbalanced amplitude and unbalanced angle of the rotating shaft on a vertical axial plane of the rotating shaft in the method for quantitatively detecting the unbalanced state of the rotating shaft of the present invention.
FIG. 5 shows schematic diagrams for calculating the potential energy of the rotating shaft at the different positions in the vertical axial plane of the rotating shaft in the method for quantitatively detecting the unbalanced state of the rotating shaft of the present invention.

FIG. 4 shows a schematic diagram of the unbalanced amplitude and unbalanced angle of the rotating shaft on a vertical axial plane of the rotating shaft in the method for quantitatively detecting unbalanced state of the rotating shaft of the present invention. Assuming the mass of the rotating shaft be m, the position of the round spot in the figure be the centroid of the rotating shaft, the length of the vertical line segment from the centroid of the rotating shaft to the axis of the rotating shaft be r, and the included angle between the vertical line segment from the centroid of the rotating shaft to the axis of the rotating shaft and a horizontal axial plane of the rotating shaft be $\theta_0$, then the unbalanced amplitude of the rotating shaft is:

$$U = m \cdot r \tag{1}$$

the unbalanced angle of the rotating shaft is: $\theta_0$;

the rotational kinetic energy of the rotating shaft can be calculated as follows:

$$K = \frac{1}{2} I \dot{\theta}^2 \tag{2}$$

wherein, K is the rotational kinetic energy of the rotating shaft, I is the inertia of the rotating shaft, and $\dot{\theta}$ is the velocity signal of the rotating shaft.

FIG. 5 shows schematic diagrams for calculating the potential energy of the rotating shaft on different positions of the vertical axial plane of the rotating shaft in the method for quantitatively detecting unbalanced state of the rotating shaft of the present invention. Along the horizontal axial plane and the vertical axial plane of the rotating shaft, it is divided into four quadrants from a first quadrant to a fourth quadrant, and when the centroid of the rotating shaft is on the vertical axial plane below the horizontal axial plane as shown in FIG. 5(e), its potential energy is zero, then the respective potential energy values on the positions shown in FIG. 5(a) to 5(d) in the above four quadrants are:

first quadrant: $P = mgr[1 + \sin(\theta_0 + \theta)]$ second quadrant: $P = mgr[1 + \sin(\pi - \theta_0 - \theta)]$ third quadrant: $P = mgr\left[1 - \cos\left(\frac{3\pi}{2} - \theta_0 - \theta\right)\right]$ fourth quadrant: $P = mgr\left[1 - \cos\left(\theta_0 + \theta - \frac{3\pi}{2}\right)\right]$ wherein, p is the potential energy, g is the gravitational acceleration, and $\theta$ is the position signal of the rotating shaft.

Therefore, they are combined to obtain:

$$P = mgr[1 + \sin(\theta_0 + \theta)] \tag{3}$$

the Lagrange kinematics equation is established as:

$$\frac{d}{dt}\frac{\partial L}{\partial \dot{\theta}} - \frac{\partial L}{\partial \theta} = \tau \tag{4}$$

wherein, $$L = K - P \tag{5}$$

$\tau$ is the torque signal of the rotating shaft, and the equations (2) and (3) are substituted into the equation (5) to obtain:

$$L = \frac{1}{2} I \dot{\theta}^2 - mgr[1 + \sin(\theta_0 + \theta)] \tag{6}$$

the equation (6) is substituted into the equation (4) to obtain:

$$\frac{d}{dt}(mr^2 \dot{\theta}) - (-mgr\cos(\theta + \theta_0)) = \tau \tag{7}$$

that is, $$I\ddot{\theta} + Ug\cos(\theta + \theta_0) = \tau \tag{8}$$

wherein, $\ddot{\theta}$ is the acceleration signal of the rotating shaft.

The calculation model of the Lagrange kinematics equation is hereby established, which is shown by the equation (8) including the unbalanced amplitude variable and unbalanced angle variable of the rotating shaft.

In order to make the model more accurate, the coulomb friction and viscous friction are introduced and the equation (8) is rewritten to obtain:

$$I\ddot{\theta} + Ug\cos(\theta + \theta_0) + F_{cf}\mathrm{sgn}(\dot{\theta}_f) + F_{vf}\dot{\theta}_f + F_{cr}\mathrm{sgn}(\dot{\theta}_r) + F_{vr}\dot{\theta}_r + \epsilon = \tau \tag{9}$$

wherein, $F_{cf}$ and $F_{vf}$ are respectively the coulomb friction coefficient and the viscous friction coefficient at clockwise rotation of the rotating shaft, $F_{cr}$ and $F_{vr}$ are respectively the coulomb friction coefficient and the viscous friction coefficient at anti-clockwise rotation of the rotating shaft, $\dot{\theta}_f$ and $\dot{\theta}_r$ are respectively the velocity signals at clockwise rotation and anti-clockwise of the rotating shaft, and $$\mathrm{sgn}(\dot{\theta}_f) = \begin{cases} 1 & \dot{\theta}_f > 0 \\ 0 & \dot{\theta}_f = 0 \\ -1 & \dot{\theta}_f < 0 \end{cases}$$

$$\mathrm{sgn}(\dot{\theta}_r) = \begin{cases} 1 & \dot{\theta}_r > 0 \\ 0 & \dot{\theta}_r = 0 \\ -1 & \dot{\theta}_r < 0 \end{cases}$$

with $\epsilon$ being the measurement error of the model.

The calculation model shown by the equation (9) is particularly suitable to the case where the rotating shaft is disposed horizontally, however, it is understandable by those skilled in the art that a similar calculation model, which is suitable to the case where the rotating shaft is disposed obliquely, can be derived easily according to the equation (9). Likewise, only the effects brought by the coulomb friction and viscous friction are considered in the model of the equation (9), and it is understandable by those skilled in the art that, in order to make the model more accurate, the effects brought by other types of friction can also be taken into consideration.

In the equation (9), $\theta$, $\dot{\theta}_f$, $\dot{\theta}_r$, $\ddot{\theta}$, and $\tau$ are respectively the known variables of the position signal, velocity signal, acceleration signal and torque signal acquired above, and U, $F_{cf}$, $F_{vf}$, $F_{cr}$, $F_{vr}$, $\theta_0$, and I are the unknown variables, and by using the nonlinear multivariable least square method, the values of the unbalanced amplitude U and the unbalanced angle $\theta_0$ can be obtained by substituting the values of $\theta$, $\dot{\theta}_f$, $\dot{\theta}_r$, $\ddot{\theta}$, and $\tau$ at different time into the equation (9) to establish a set of equations.

FIGS. 6(a) to 6(e) show test parameters used for quantitatively detecting the unbalanced state of the rotating shaft, with the corresponding test results shown in FIGS. 7(a) to 7(e).

Figure 6:
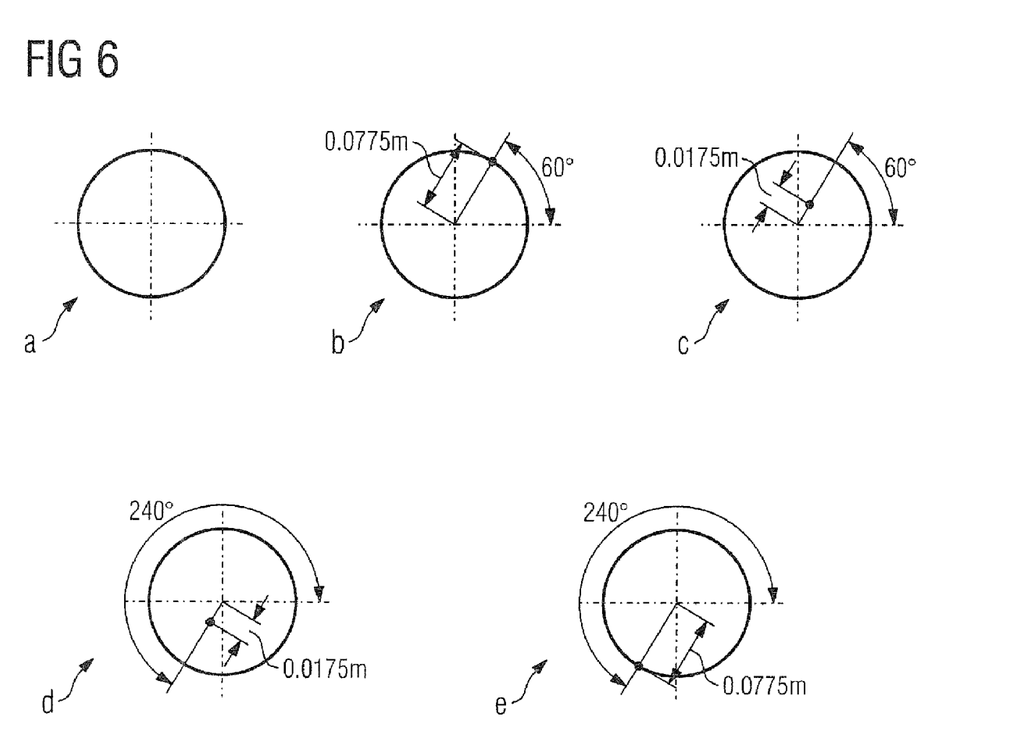

In FIG. 6(a), no additional load was added on the rotating shaft.

In FIG. 6(b), an additional load with the mass of 0.165 Kg was added at r=0.0775 m, $\theta_0$=60° of the rotating shaft.

In FIG. 6(c), an additional load with the mass of 0.165 Kg was added at r=0.0175 m, $\theta_0$=60° of the rotating shaft.

In FIG. 6(d), an additional load with the mass of 0.165 Kg was added at r=0.0175 m, $\theta_0$=240° of the rotating shaft.

In FIG. 6(e), an additional load with the mass of 0.165 Kg was added at r=0.0775 m, $\theta_0$=240° of the rotating shaft.

FIGS. 7(a) to 7(e) show the various results corresponding to the test parameters of FIGS. 6(a) to 6(e) in form of polar-coordinate diagrams, wherein the radial coordinates (such as 0.01, 0.02, 0.03 in these Figures) indicate the values of the unbalanced amplitude, and the polar angle coordinates (such as 0°, 30°, 60°, . . . , 330° in these Figures) indicate the values of the unbalanced angle.

Figure 7:
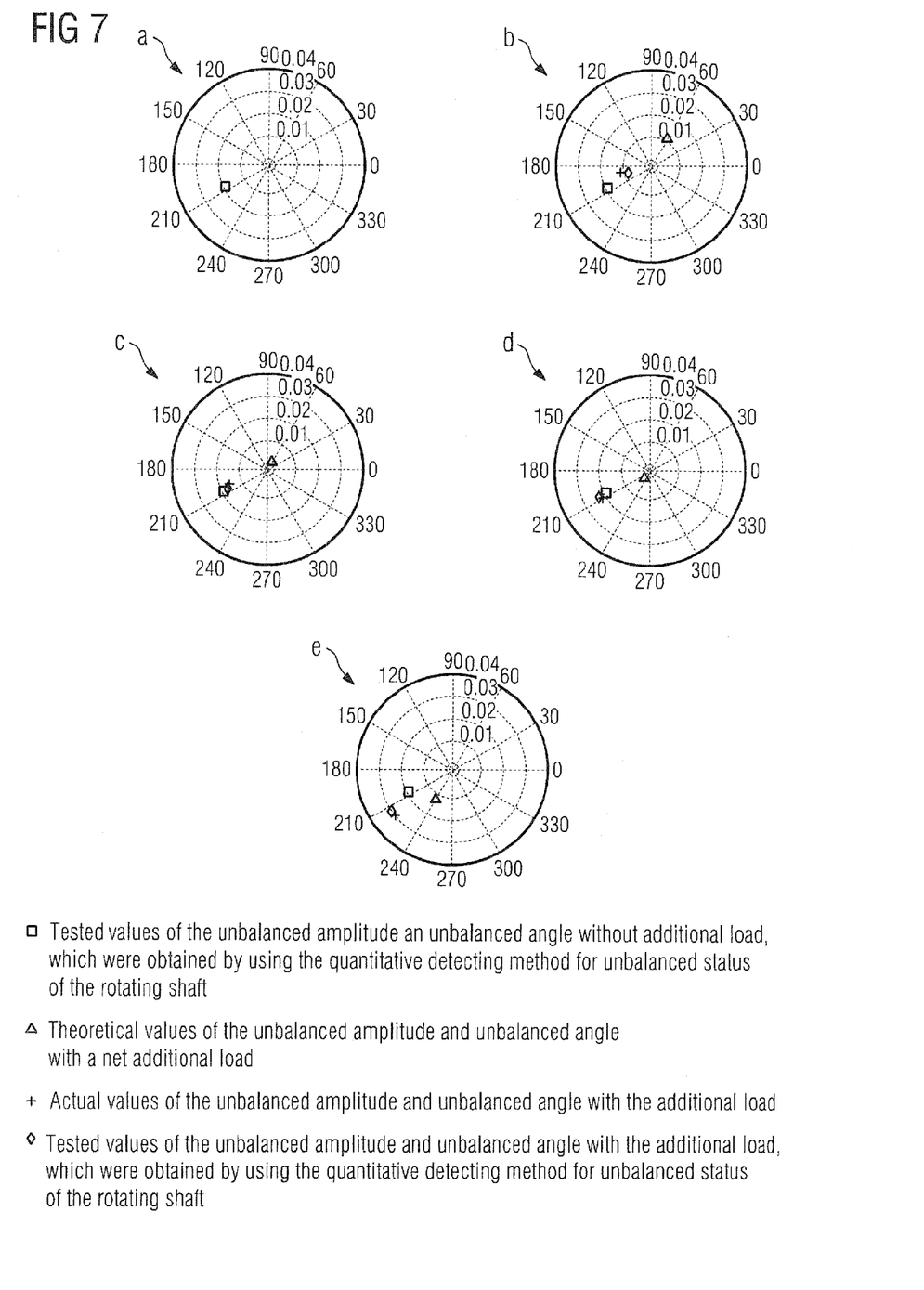

Various results of the tests include: the test values of the unbalanced amplitude and unbalanced angle without additional load, which are marked as rectangular symbols and were acquired by using the method for quantitatively detecting unbalanced state of the rotating shaft of the present invention; the theoretical values of the unbalanced amplitude and unbalanced angle with net additional load, which are marked as triangle symbols, wherein the theoretical values can be determined directly according to test parameters given by FIGS. 6(a) to 6(e), for example, in the test of FIG. 6(b), the unbalanced amplitude was U=m·r 0.165 Kg 0.0775 m=0.0127875 Kg·m the unbalanced angle was $\theta_0$=60°, and the above results are marked as triangle symbols in the corresponding positions of the polar coordinate system in FIG. 7(b); the actual values of the unbalanced amplitude and unbalanced angle with additional load, which are marked as plus symbols, wherein the actual values are vector sum of test values of the unbalanced amplitude and unbalanced angle without additional load marked as rectangular symbols and obtained by using the method for quantitatively detecting unbalanced state of the rotating shaft respectively and theoretical values of the unbalanced amplitude and unbalanced angle with net additional load marked as triangle symbols; and the test values of the unbalanced amplitude and unbalanced angle with additional load, which are marked as diamond symbols and obtained by using the method for quantitatively detecting the unbalanced state of the rotating shaft.

The higher is the degree of coincidence between the above test values of the unbalanced amplitude and unbalanced angle with additional load (which are marked as diamond symbols and obtained by using the method for quantitatively detecting the unbalanced state of the rotating shaft) and actual values of the unbalanced amplitude and unbalanced angle with additional load (which are marked as plus symbols), then the higher is the accuracy of the method for quantitatively detecting the unbalanced state of the rotating shaft of the present invention. It can be found in FIGS. 7(b) to 7(e) that the test values marked as diamond symbols and actual values marked as plus symbols are substantially coincident, only with a little deviation, and this indicates quite high an accuracy of the method for quantitatively detecting the unbalanced state of the rotating shaft according to the present invention.

Figure 8:
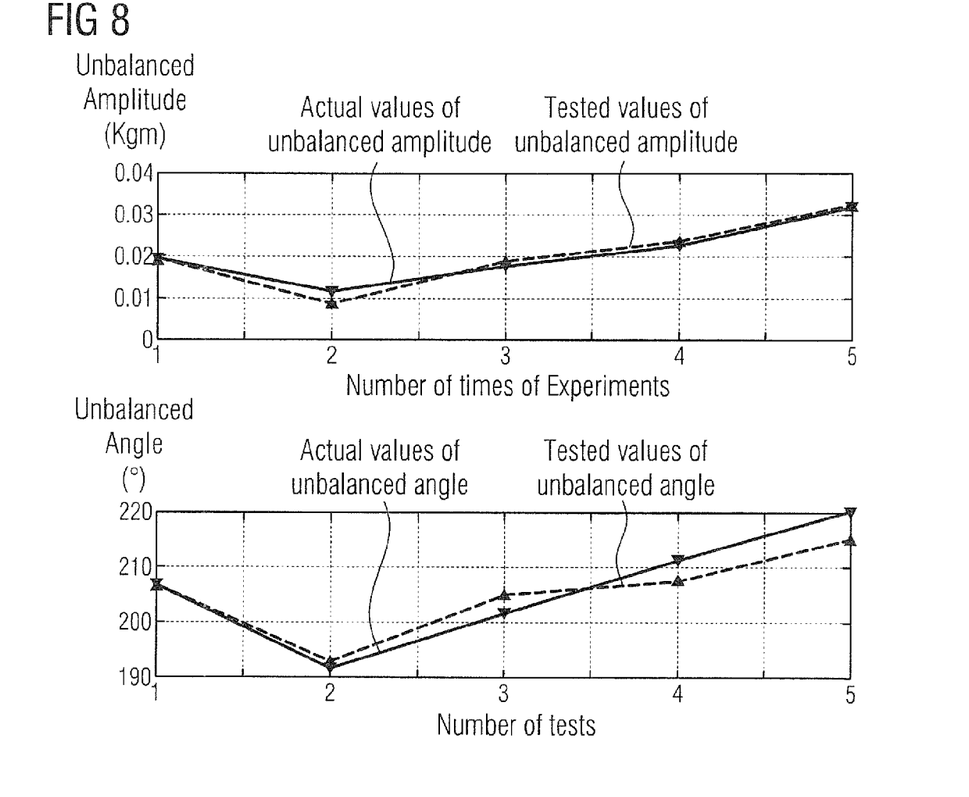
FIG. 8 is a schematic diagram comparing the test values and actual values of the unbalanced amplitude and the unbalanced angle of the rotating shaft corresponding to FIG. 7.

FIG. 8 further provides comparison diagrams of the test values and actual values of the unbalanced amplitude and the unbalanced angle, wherein, the test times 1 to 5 correspond to all tests of FIGS. 6(a) to 6(e), respectively, in the Figures, solid lines denote actual values of the unbalanced amplitude and the unbalanced angle, respectively, and dashed lines denote the test values of the unbalanced amplitude and the unbalanced angle, respectively, and it can be seen that the degree of coincidence of the test values and actual values is also quite high, and the results obtained by using the method for quantitatively detecting the unbalanced state of the rotating shaft according to the present invention reflect the unbalanced state of the rotating shaft comparatively quantitatively and accurately, thereby the unbalanced state can be judged accurately so as to provide the related data for the subsequent manual or automatic correction.

In order to further verify the accuracy of the method for quantitatively detecting the unbalanced state of the rotating shaft of the present invention, a number of additional tests were conducted under the conditions different from those of the above tests, and the test parameters of the additional tests were:

Test 1: no additional load was added on the rotating shaft.

Test 2: an additional load with the mass of 0.038 Kg was added at r=0.055 m, $\theta_0$=270° of the rotating shaft.

Test 3: an additional load with the mass of 0.038 Kg was added at r=0.055 m, $\theta_0$=30° of the rotating shaft.

The above tests 1, 2, 3 were repeated 3 times respectively under the same test conditions, and the test values of the unbalanced amplitude and the unbalanced angle were obtained by using the method for quantitatively detecting the unbalanced state of the rotating shaft of the present invention are shown in the following table:

|  |  | Test Values | |
| --- | --- | --- | --- |
| Tests | Number of times | Unbalanced amplitude (Kg · m) | Unbalanced angle (Degree) |
| Test 1 | 1 | 0.006188 | 97.952568 |
|  | 2 | 0.006414 | 97.143258 |
|  | 3 | 0.006907 | 102.156855 |
| Test 2 | 1 | 0.004186 | 113.982468 |
|  | 2 | 0.004282 | 112.38793 |
|  | 3 | 0.004419 | 111.098232 |
| Test 3 | 1 | 0.007939 | 78.940742 |
|  | 2 | 0.007432 | 87.980809 |
|  | 3 | 0.007416 | 88.936889 |

The average values of the unbalanced amplitude and the unbalanced angle are calculated from the results of 3 times of tests in the above separate tests 1, 2, 3 and compared with the actual values, wherein, the actual values are vector sum of the test values of the unbalanced amplitude and unbalanced angle without additional load obtained by using the method for quantitatively detecting the unbalanced state of the rotating shaft of the present invention respectively and the theoretical values of the unbalanced amplitude and unbalanced angle with a net additional load, and the comparison results are shown in the following table:

|  | Actual Values | | Test Values (Average Values) | |
| --- | --- | --- | --- | --- |
| Tests | Unbalanced Amplitude (Kg · m) | Unbalanced Angle (Degree) | Unbalanced Amplitude (Kg · m) | Unbalanced Angle (Degree) |
| Test 1 | 0.006503 | 99.084227 | 0.006503 | 99.084227 |
| Test 2 | 0.00454 | 104.3789 | 0.004295667 | 112.4895433 |
| Test 3 | 0.00742762 | 85.056989 | 0.007595667 | 85.28614667 |

It can be seen that the test values obtained by calculating the average values of the unbalanced amplitude values and unbalanced angle values are more consistent with the actual values and therefore, they reflect the unbalanced state of the rotating shaft more accurately and quantitatively.

Figure 9:
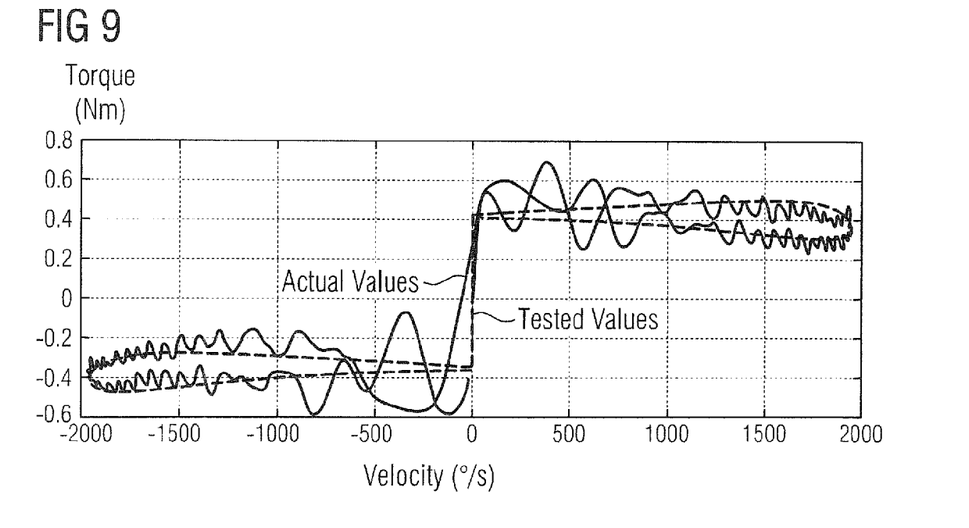
FIG. 9 is a schematic diagram comparing the test values, representing that the torque of the rotating shaft changes with the velocity, acquired from the test values of the unbalanced amplitude and the unbalanced angle of the rotating shaft, and the actual values, representing that the torque of the rotating shaft changes with the velocity, acquired by measuring the current of motor and calculation made thereto.

The method for quantitatively detecting unbalanced state of the rotating shaft according to the present invention reflects the unbalanced state of the rotating shaft quantitatively and accurately, and this can be confirmed in other aspects, as shown in FIG. 9, wherein the solid line denotes the actual values of the torque of the rotating shaft changing with the velocity, which are obtained by measuring the current of the motor and then doing the calculation, and the dashed line denotes the test values of the torque of the rotating shaft changing with the velocity, which are calculated after having obtained the values of the unbalanced amplitude and the values of unbalanced angle by the method for quantitatively detecting the unbalanced state of the rotating shaft of the present invention and then reversely substituting them into equation (9); and it can be seen that, the test values reflected by the dashed line fit accurately with the actual values reflected by the solid line and therefore, this further confirms that the method for quantitatively detecting unbalanced state of the rotating shaft according to the present invention can reflect the unbalanced state of the rotating shaft fairly accurately, so that the unbalanced state can be judged accurately to provide the relevant data for the subsequent manual or automatic correction.

Figure 10:
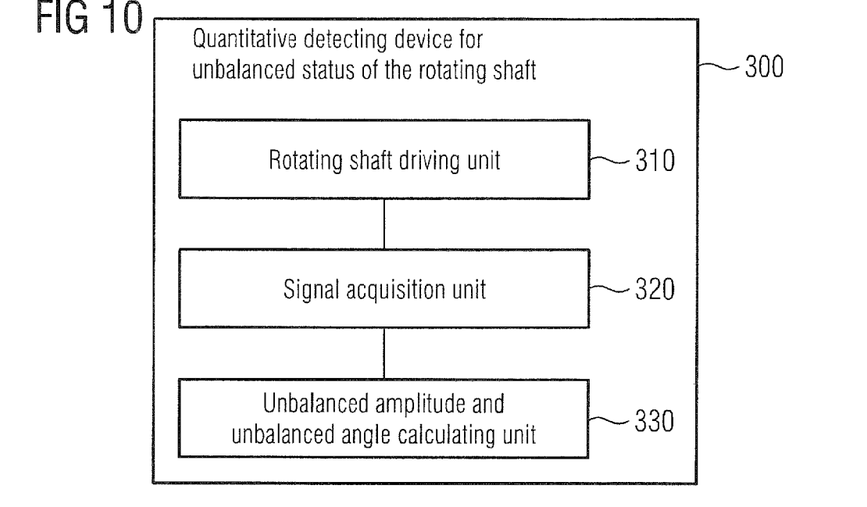
FIG. 10 is a schematic diagram of the structure of the apparatus for quantitatively detecting the unbalanced state of the rotating shaft according to the present invention.

Correspondingly, the present invention also proposes an apparatus 300 for quantitatively detecting the unbalanced state of a rotating shaft, as show in FIG. 10. The apparatus 300 for quantitatively detecting the unbalanced state of the rotating shaft includes: a rotating shaft drive unit 310 for driving the rotating shaft; a signal acquisition unit 320 connected to the rotating shaft drive unit 310 for acquiring a position signal, a velocity signal, an acceleration signal, and a torque signal of the rotating shaft; an unbalanced amplitude value and unbalanced angle calculating unit 330 connected to the signal acquisition unit 320 for establishing a Lagrange kinematics equation including an unbalanced amplitude variable and an unbalanced angle variable of the rotating shaft according to the rotational kinetic energy and potential energy of the rotating shaft, and acquiring a value of unbalanced amplitude and a value of unbalanced angle of the rotating shaft by solving the equation with a nonlinear multivariable method according to the position signal, the velocity signal, the acceleration signal, and the torque signal acquired by the above signal acquisition unit; wherein, the unbalanced amplitude of the rotating shaft is the product of the length of a vertical line segment from the centroid of the rotating shaft to the axis of the rotating shaft and the mass of the rotating shaft, and the unbalanced angle is the included angle between the vertical line segment from the centroid of the rotating shaft to the axis of the rotating shaft and a horizontal axial plane of the rotating shaft.

Figure 11:
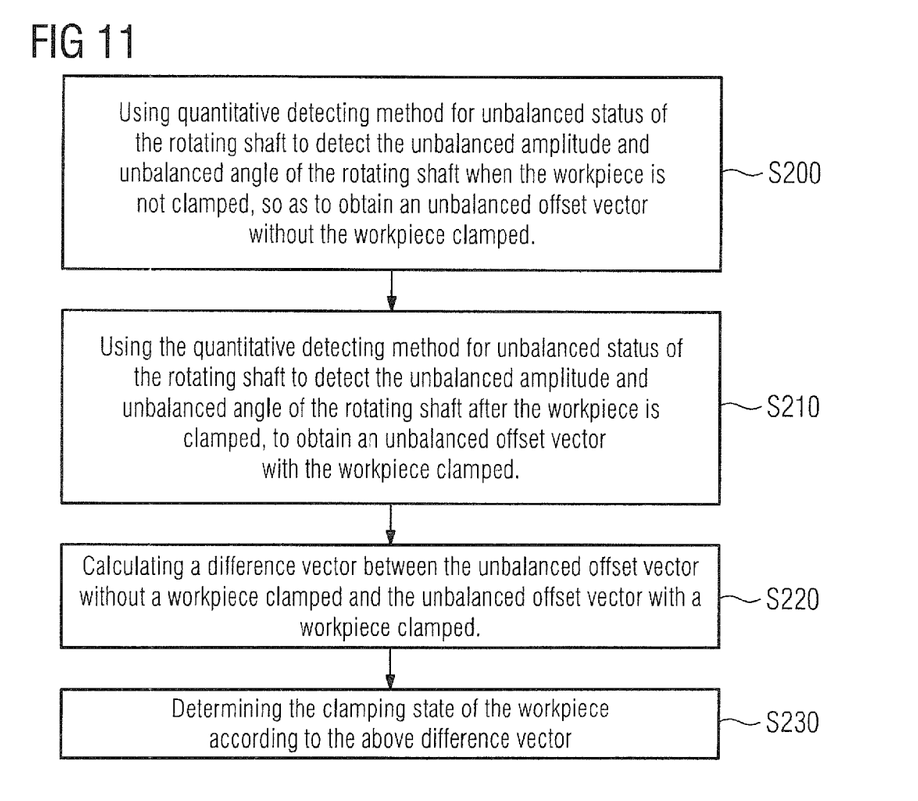
FIG. 11 is a flowchart of a method for detecting the clamping state of a workpiece according to the present invention.

Correspondingly, the present invention further proposes a method for detecting the clamping state of a workpiece, as shown in FIG. 11, with the method including the following steps:

At step S200, an unbalanced offset vector without the workpiece being clamped is acquired by using the method for quantitatively detecting the unbalanced state of the rotating shaft to detect the unbalanced amplitude and unbalanced angle of the rotating shaft without the workpiece being clamped:

$$\vec{M} = A_1 \angle \theta_1 \tag{10}$$

wherein, $A_1$ is the unbalanced amplitude of the rotating shaft without the workpiece being clamped, and $\theta_1$ is the unbalanced angle of the rotating shaft without the workpiece being clamped.

At step S210, an unbalanced offset vector after the workpiece has been clamped is acquired by using the method for quantitatively detecting the unbalanced state of the rotating shaft to detect the unbalanced amplitude and unbalanced angle of the rotating shaft after the workpiece has been clamped:

$$\vec{N} = A_2 \angle \theta_2 \tag{11}$$

wherein, $A_2$ is the unbalanced amplitude of the rotating shaft without the workpiece being clamped, and $\theta_2$ is the unbalanced angle of the rotating shaft without the workpiece being clamped.

At step S220, a difference vector between the unbalanced offset vectors without the workpiece being clamped and after the workpiece has been clamped is calculated:

$$\vec{R} = \vec{M} - \vec{N} = A_R \angle \theta_R \tag{12}$$

wherein, $A_R$ is the unbalanced amplitude of the difference vector and $\theta_R$ is the unbalanced angle of the difference vector.

At step S230, the clamping state of the workpiece is determined from the above difference vector.

In the equation (12), the bigger $A_R$ is compared to the difference vector $\vec{R}$, the bigger the unbalanced offset of the workpiece, that is, the worse the clamping state of the workpiece.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for quantitatively detecting an unbalanced state of a rotating shaft, comprising the steps of:
    driving the rotating shaft;
    acquiring a position signal, a velocity signal, an acceleration signal, and a torque signal of the rotating shaft; and
    establishing, according to a rotational kinetic energy and a potential energy of the rotating shaft, a Lagrange kinematics equation including an unbalanced amplitude variable and an unbalanced angle variable of the rotating shaft, and
    acquiring, according to the position signal, the velocity signal, the acceleration signal, and the torque signal, a value of the unbalanced amplitude and a value of the unbalanced angle of the rotating shaft by solving the equation by means of a nonlinear multivariable method;
    wherein the unbalanced amplitude of the rotating shaft is a product of a length of a vertical line segment from a centroid of the rotating shaft to an axis of the rotating shaft and a mass of the rotating shaft, and the unbalanced angle of the rotating shaft is an included angle between the vertical line segment from the centroid of the rotating shaft to the axis of the rotating shaft and a horizontal axial plane of the rotating shaft.

2. The method of claim 1, further comprising the step of filtering the acquired position signal, the acquired velocity signal, the acquired acceleration signal and the acquired torque signal of the rotating shaft.

3. The method of claim 1, wherein the rotating shaft is driven by a motor, further comprising the steps of:

applying a combined S-shaped and sinusoidal velocity profile as an energizing signal to the motor, with the combined velocity profile including a position profile, a velocity profile, and an acceleration profile;

dividing the profiles along a time axis into an accelerating stage, a sinusoidal velocity profile stage, and a decelerating stage, and selecting the velocity profile such that a motor speed in the accelerating and decelerating stages does not exhibit an abrupt change.

4. The method of claim 3, wherein the unbalanced amplitude of the rotating shaft is:

$$U = m \cdot r$$

wherein m is the mass of the rotating shaft, and r is the distance from the centroid of the rotating shaft to the axis of the rotating shaft.

5. The method of claim 4, wherein a rotational kinetic energy of the rotating shaft is:

$$K = \frac{1}{2} I \dot{\theta}^2$$

wherein I is an inertia of the rotating shaft, and $\dot{\theta}$ is the velocity signal of the rotating shaft.

6. The method of claim 5, wherein a potential energy of the rotating shaft is:

$$P = mgr[1 + \sin(\theta_0 + \theta)]$$

wherein g is the gravitational constant, $\theta_0$ is the unbalanced angle of the rotational angle, and $\theta$ is the position signal of the rotating shaft.

7. The method of claim 6, wherein the Lagrange kinematics equation including the unbalanced amplitude variable and the unbalanced angle variable of the rotating shaft is established from the rotational kinetic energy and the potential energy of the rotating shaft as follows:

$$\frac{d}{dt}\frac{\partial L}{\partial \dot{\theta}} - \frac{\partial L}{\partial \theta} = \tau$$

wherein, $\tau$ is the torque signal of the rotating shaft, $$L = K - P$$

so that:

$$L = \frac{1}{2}I\dot{\theta}^2 - mgr[1 + \sin(\theta_0 + \theta)]$$

leading to:

$$\frac{d}{dt}(mr^2\dot{\theta}) - (-mgr\cos(\theta + \theta_0)) = \tau$$

so that:

$$I\ddot{\theta} + Ug\cos(\theta + \theta_0) = \tau$$

wherein $\ddot{\theta}$ is the acceleration signal of the rotating shaft.

8. The method of claim 7, further comprising the step of introducing Coulomb friction and viscous friction in the equation $$I\ddot{\theta} + Ug\cos(\theta + \theta_0) = \tau,$$

thereby producing:

$$I\ddot{\theta} + Ug\cos(\theta+\theta_0) + F_{cf}\text{sgn}(\dot{\theta}_f) + F_{vf}\dot{\theta}_f + F_{cr}\text{sgn}(\dot{\theta}_r) + F_{vr}\dot{\theta}_r + \epsilon = \tau$$

wherein $F_{cf}$ and $F_{vf}$ are the Coulomb friction coefficient and the viscosity friction coefficient, respectively, when the shaft is rotating in a forward direction, $F_{cr}$ and $F_{vr}$ are the Coulomb friction coefficient and the viscosity friction coefficient, respectively, when the shaft is rotating in a backward direction, $\dot{\theta}_f$ and $\dot{\theta}_r$ are the velocity signals when the shaft is rotating in the forward and backward directions, respectively, and $$\text{sgn}(\dot{\theta}_f) = \begin{cases} 1 & \dot{\theta}_f > 0 \\ 0 & \dot{\theta}_f = 0 \\ -1 & \dot{\theta}_f < 0 \end{cases}$$

$$\text{sgn}(\dot{\theta}_r) = \begin{cases} 1 & \dot{\theta}_r > 0 \\ 0 & \dot{\theta}_r = 0 \\ -1 & \dot{\theta}_r < 0 \end{cases}$$

and $\epsilon$ is a measurement error.

9. The method of claim 8, wherein the nonlinear multivariable method is a least square method.

10. An apparatus for quantitatively detecting an unbalanced state of a rotating shaft, comprising:

a drive unit driving the rotating shaft;

a signal acquisition unit for acquiring a position signal, a velocity signal, an acceleration signal, and a torque signal; and an unbalanced amplitude value and unbalanced angle value calculating unit for establishing a Lagrange kinematics equation including an unbalanced amplitude variable and an unbalanced angle variable of the rotating shaft according to a rotational kinetic energy and a potential energy of the rotating shaft, and for acquiring a value of unbalanced amplitude and a value of unbalanced angle of the rotating shaft by solving the equation with a nonlinear multivariable method according to the acquired position signal, the acquired velocity signal, the acquired acceleration signal, and the acquired torque signal;

wherein the unbalanced amplitude of the rotating shaft is a product of a length of a vertical line segment from a centroid of the rotating shaft to an axis of the rotating shaft and a mass of the rotating shaft, and the unbalanced angle is an included angle between the vertical line segment from the centroid of the rotating shaft to the axis of the rotating shaft and a horizontal axial plane of the rotating shaft.

11. A method for detecting a clamping state of a workpiece, comprising the steps of:

detecting an unbalanced amplitude and an unbalanced angle of the rotating shaft without the workpiece clamped with the method of claim 1, and computing from the unbalanced amplitude and the unbalanced angle a first unbalanced offset vector:

$$\vec{M} = A_1 \angle \theta_1$$

wherein, $A_1$ is the unbalanced amplitude of the rotating shaft without the workpiece being clamped, and is the unbalanced angle of the rotating shaft without the workpiece being clamped;

detecting an unbalanced amplitude and an unbalanced angle of the rotating shaft with the workpiece clamped on the rotating shaft with the method of claim 1, and computing from the unbalanced amplitude and the unbalanced angle a second unbalanced offset vector:

$$\vec{N}=A_2\angle\theta_2$$

wherein, $A_2$ is the unbalanced amplitude of the rotating shaft with the workpiece being clamped, and $\theta_2$ is unbalanced angle of the rotating shaft with the workpiece being clamped;

calculating a difference vector between the unbalanced offset vector without the workpiece being clamped and the unbalanced offset vector with the workpiece being clamped:

$$\vec{R}=\vec{M}-\vec{N}=A_R\angle\theta_R$$

wherein, $A_R$ is the unbalanced amplitude of the difference vector, and $\theta_R$ is the unbalanced angle of the difference vector; and determining from the difference vector the clamping state of the workpiece, wherein a bigger $A_R$ of the difference vector $\vec{R}$ indicates a bigger unbalanced deviation of the workpiece, representing an inferior clamping state of the workpiece.

12. A method for quantitatively detecting an unbalanced state of a rotating shaft, comprising the following steps of:
driving the rotating shaft;
acquiring a position signal, a velocity signal, an acceleration signal, and a torque signal of the rotating shaft; and
solving with a nonlinear multivariable method a Lagrange kinematics equation to determine an unbalanced amplitude variable and an unbalanced angle variable of the rotating shaft from the acquired position signal, the acquired velocity signal, the acquired acceleration signal, and the acquired torque signal of the rotating shaft,
wherein the unbalanced amplitude variable of the rotating shaft is equal to a product of a distance from a centroid of the rotating shaft to an axis of the rotating shaft and a predetermined mass of the rotating shaft, and the unbalanced angle variable of the rotating shaft is an included angle between a vertical line segment from the centroid of the rotating shaft to the axis of the rotating shaft and a horizontal axial reference plane of the rotating shaft.

13. The method of claim 12, further comprising the step of filtering the acquired position signal, the acquired velocity signal, the acquired acceleration signal and the acquired torque signal of the rotating shaft.

14. The method of claim 12, further comprising the steps of driving the rotating shaft with a motor, energizing the motor with a combined S-shaped and sinusoidal velocity profile having a position profile component, a velocity profile component, and an acceleration profile component, and dividing the profiles along a time axis into an accelerating stage, a sinusoidal velocity profile stage, and a decelerating stage, with the combined S-shaped and sinusoidal velocity profile being selected such that a velocity of the motor during the accelerating and decelerating stages does not exhibit an abrupt change.

15. The method of claim 12, wherein the nonlinear multivariable method is a least square method.

16. An apparatus for quantitatively detecting an unbalanced state of a rotating shaft, comprising:

a shaft drive unit driving the rotating shaft, the shaft drive unit having an electric motor;
a signal generator generating a drive signal for the electric motor that produces a combined S-shaped and sinusoidal velocity profile having a position profile component, a velocity profile component, and an acceleration profile component, with the combined S-shaped and sinusoidal velocity profile being selected such that a velocity of the motor during accelerating and decelerating stages does not exhibit an abrupt change;
a signal acquisition unit for acquiring a position signal, a velocity signal, an acceleration signal, and a torque signal of the rotating shaft; and
a calculating unit that solves with a nonlinear multivariable method a Lagrange kinematics equation to determine an unbalanced amplitude variable and an unbalanced angle variable of the rotating shaft from the acquired position signal, the acquired velocity signal, the acquired acceleration signal, and the acquired torque signal of the rotating shaft,
wherein the unbalanced amplitude of the rotating shaft is equal to a product of a distance from a centroid of the rotating shaft to an axis of the rotating shaft and a mass of the rotating shaft, and the unbalanced angle of the rotating shaft is an included angle between a vertical line segment from the centroid of the rotating shaft to the axis of the rotating shaft and a horizontal axial plane of the rotating shaft.

17. A method for detecting a clamping state of a workpiece, comprising the steps of:
without the workpiece being clamped:
a) driving a rotating shaft;
b) acquiring a position signal, a velocity signal, an acceleration signal, and a torque signal of the rotating shaft; and
c) solving with a nonlinear multivariable method a Lagrange kinematics equation to determine an unbalanced amplitude variable and an unbalanced angle variable of the rotating shaft from the acquired position signal, the acquired velocity signal, the acquired acceleration signal, and the acquired torque signal of the rotating shaft,
d) wherein the unbalanced amplitude variable of the rotating shaft is equal to a product of a distance from a centroid of the rotating shaft to an axis of the rotating shaft and a predetermined mass of the rotating shaft, and the unbalanced angle variable of the rotating shaft is an included angle between a vertical line segment from the centroid of the rotating shaft to the axis of the rotating shaft and a horizontal axial reference plane of the rotating shaft, with the unbalanced amplitude and the unbalanced angle of the rotating shaft defining an unbalanced offset vector,
clamping the workpiece on the shaft;
repeating steps a) through d) above;
calculating a difference vector between the unbalanced offset vector without the workpiece being clamped and the unbalanced offset vector with the workpiece being clamped; and
determining the clamping state of the workpiece from the difference vector, with a larger difference vector indicating an inferior clamping state of the workpiece.

* * * * *

UNITED STATES PATENT AND TRADEMARK OFFICE
CERTIFICATE OF CORRECTION

| | | |
|---|---|---|
| PATENT NO. | : 8,225,657 B2 | Page 1 of 1 |
| APPLICATION NO. | : 12/497963 | |
| DATED | : July 24, 2012 | |
| INVENTOR(S) | : Shao et al. | |

It is certified that error appears in the above-identified patent and that said Letters Patent is hereby corrected as shown below:

Column 14, line 5, change "wherein and $F_{cf}$ are $F_{vf}$" to --wherein $F_{cf}$ and $F_{vf}$ are--

Column 14, line 65, change "and is the" to --and $\theta_1$ is the--

Column 15, line 9, change "and $\theta_2$ is unbal-" to --and $\theta_2$ is the unbal- --

Signed and Sealed this
Eleventh Day of September, 2012

David J. Kappos
*Director of the United States Patent and Trademark Office*